Patented Aug. 24, 1943

2,327,975

UNITED STATES PATENT OFFICE 2,327,975

VULCANIZABLE POLYMERIZATION PRODUCT AND A PROCESS OF PRODUCING SAME

Ewald Zaucker, Schkopau, Germany; vested in the Alien Property Custodian

No Drawing. Application April 3, 1940, Serial No. 327,636. In Germany April 3, 1939

6 Claims. (Cl. 260—23)

The present invention relates to a process of producing plasticized polymerization products capable of being vulcanized and the products obtained thereby.

Vulcanizable polymerization products of hydrocarbons having conjugated double linkages or of their interpolymerization products with other unsaturated compounds, such as styrene or acrylic nitrile, sometimes possess an insufficient plasticity by which the further processing of such products is rendered more difficult. While it is known that natural rubber may be rendered more plastic and capable of being more easily worked by subjecting it to a gentle oxidation, synthetic rubber-like polymerization products are liable to turn hard and brittle or glutinous under the influence of atmospheric oxygen thus losing their valuable properties.

Since oxygen or agents supplying oxygen detrimentally affect those synthetic products already at room temperature, an addition of so-called stabilizers is required to prevent or retard the aforesaid detrimental effects. When the polymerization products provided with such stabilizers are treated for plastification with oxygen or agents supplying oxygen, rather an intensive treatment is necessary in order to cause the stabilized products to be degraded into more plastic products.

I have now found that vulcanizable polymerization products may be plasticized under considerably milder conditions by treating them with oxygen or agents supplying oxygen in the presence as stabilizers of amines and of difficultly volatile or non-volatile saturated aliphatic or cycloaliphatic carboxylic acids or their salts.

Among suitable stabilizing amines I may mention primary, secondary or tertiary mono- or polyamines, for example, dimethylaniline, 2-dimethylaminonaphthalene, 2-phenylaminonaphthalene, 4'-tolyl-1-naphthylamine, 2.7-naphthylenediamine, 2.2'-dinaphthylamine or 1.4-dibeta-naphthyl-aminobenzene. In the case of polymerization products very sensitive to oxygen the amines are preferably added already before the polymerization, if they will not hamper the same.

Suitable carboxylic acids of the said kind are, for example, lauric acid, stearic acid, coconut fatty acid, fatty acids obtained by the oxidation of paraffin wax, montanic acid, fatty acids having a branched-chain prepared by oxidizing the higher molecular alcohols obtained by the catalytic hydrogenation of carbon monoxide by means of potassium hydroxide, also cyclohexylcarboxylic acids, saturated naphthenic acids as well as substituted carboxylic acids, for example dihydroxy stearic acid. The salts of the said acids may also be used, but their efficiency is generally a little smaller than that of the free acids. The acids or their salts may be added before, during or after the polymerization. When adding them while polymerizing in an aqueous emulsion, the emulsion may be treated, if necessary after acidification when the polymerization is carried out in an alkaline medium, with gases containing oxygen or agents yielding oxygen or the polymerizate may be precipitated in a crumbly state and treated after drying with gases containing oxygen at an elevated temperature. The acids or their salts may also be incorporated by mixing them with the finished product, for example by milling or kneading. When agents supplying oxygen are not previously added, the polymerization product should be comminuted or drawn out into thin sheets in order to provide for the largest possible superficial area of the polymerization product for the action of oxygen.

The efficiency of the carboxylic acids may be ascertained with advantage by the following simple test, in which, by way of example, an interpolymerization product was employed:

An interpolymerization product from 75 parts of butadiene and 25 parts of styrene stabilized with 3 per cent by weight of phenyl-beta-naphthylamine is mixed with 2 per cent of the carboxylic acid chosen or a salt thereof and the mass is reduced to crumbs. These crumbs are treated at 130° C. for 100 minutes with compressed air of 3.5 atmospheres. By this treatment the polymerization products, on which benzene initially acts as a swelling agent only, are increasingly rendered soluble therein, so that the determination of the viscosity in centipoises is an indication of the degree of the degradation attained. The more the plasticity has advanced, the lower is the viscosity.

The following table shows the efficiency of various saturated aliphatic and alicyclic carboxylic acids and their salts used, as described above, in connection with two slightly differing polymerization products capable of degradation:

Table 1

| Addition | Viscosity in centipoises of a 4 per cent benzene solution measured after treatment with compressed air of 3.5 atm. under the following conditions: | | | | | |
|---|---|---|---|---|---|---|
| | Min. | Temp. | Min. | Temp. | Min. | Temp. |
| | 70 | 130° | 100 | 130° | 100 | 140° |
| Without addition | | | Insoluble | | Insoluble | |
| Montanic acid | | | 26 | | 8.1 | |
| Stearic acid | 20.6 | | 10.8 | | | |
| Dihydroxy stearic acid | 67.4 | | 34.2 | | | |

Table 2

|  | Min. 100 | Temp. 130° |
|---|---|---|
| Without addition | | Insoluble |
| Montanic acid | | 102 |
| Stearic acid | | 25.8 |
| Fatty acids obtained by paraffin oxidation | | 38.5 |
| Cyclohexane carboxylic acid | | 19 |
| Naphthenic acid (practically saturated) | | 14.1 |
| Sodium stearate | | 80.2 |
| Potassium stearate | | 71.6 |
| Magnesium stearate | | 114.3 |
| Calcium stearate | | 110.9 |
| Aluminium stearate | | 77.2 |
| Zinc stearate | | 162.5 |
| Aluminium naphthenate | | 34.6 |

The following examples serve to illustrate how the present invention may be carried out in practice, but the invention is not restricted to the said examples. The parts are by weight.

Example 1

250 parts of an interpolymerization product obtained by emulsion-polymerization from 75 parts of butadiene and 25 parts of styrene are stabilized with 3 parts of phenyl-beta-naphthylamine and after incorporating 5 parts of stearic acid by rolling, are drawn out into thin foils. These are heated at 130° C. for 70 minutes in compressed air of 3.5 atmospheres. The polymerization product becomes soft and well workable; it may easily be incorporated with fillers and may well be worked on the extruding press.

The vulcanizates are equal in strength to those from an untreated interpolymerization product, while they exceed them in elasticity.

By subjecting the polymerization product to the same treatment but without the addition of stearic acid, it becomes considerably less plastic and remains insoluble in benzene even when heated at 140° C. for 100 minutes.

When a polymerization product from butadiene alone is used instead of the said interpolymerization product and subjected to an equal treatment with an addition of the amine and the acid its workability is improved and also its tensile strength.

The stearic acid may also be added already during the emulsion-polymerization in a weakly alkaline medium and uniformly distributed throughout the polymerization product by coagulating the dispersion of the polymerization product by the addition of acid precipitants. The polymerization thus precipitates in a crumbly state and may be plasticized in the same manner as above.

Example 2

An aqueous dispersion obtained by the emulsion-polymerization of 75 parts of butadiene and 25 parts of styrene is stabilized by the addition of 3 per cent by weight of phenyl-beta-naphthylamine, whereupon 2 per cent of purified montanic acid (percentage with reference to the polymerization product) dissolved in an aqueous solution of caustic potash necessary for neutralizing the acid are added. On acidifying the dispersion the interpolymerization product is precipitated in the form of crumbs. These are treated in compressed air at 130° C. for 70 minutes. A well workable plastic polymerization product is thus obtained yielding vulcanizates of excellent properties.

What I claim is:

1. Process of plasticizing synthetic rubber resulting from the emulsion polymerization of an open chain diolefine having conjugated double bonds which consists in subjecting the synthetic rubber to an oxidizing treatment in the presence only of a stabilizing agent containing an amino group selected from the class consisting of aromatic amines of the benzene and naphthalene series and a substance selected from the group consisting of from difficultly volatile to non-volatile saturated aliphatic and cycloaliphatic carboxylic acids, their hydroxy substitution products and their salts, until the synthetic rubber has become substantially more plastic.

2. The process of plasticizing synthetic rubber resulting from the emulsion polymerization of a mixture of an open chain diolefine having conjugated double bonds and another organic compound polymerizable under the same conditions which consists in subjecting the synthetic rubber to an oxidizing treatment in the presence only of a stabilizing agent containing an amino group selected from the class consisting of aromatic amines of the benzene and naphthalene series and a substance selected from the group consisting of from difficultly volatile to non-volatile saturated aliphatic and cycloaliphatic carboxylic acids, their hydroxy substitution products and their salts, until the synthetic rubber has become more plastic.

3. The process of plasticizing synthetic rubber resulting from the emulsion polymerization of a mixture of butadiene and styrene which consists in subjecting the synthetic rubber to an oxidizing treatment in the presence only of a stabilizing agent containing an amino group selected from the class consisting of aromatic amines of the benzene and naphthalene series and a substance selected from the group consisting of from difficultly volatile to non-volatile saturated aliphatic and cyclo aliphatic carboxylic acids, their hydroxy substitution products and their salts, until the synthetic rubber has become substantially more plastic.

4. Plasticized synthetic rubber resulting from the emulsion polymerization of an open chain diolefine having conjugated double bonds and plasticized according to the process of claim 1.

5. Plasticized synthetic rubber resulting from the emulsion polymerization of a mixture of an open chain diolefine having conjugated double bonds and another organic compound polymerizable under the same conditions and plasticized according to the method of claim 2.

6. Plasticized synthetic rubber resulting from the emulsion polymerization of a mixture of butadiene and styrene and plasticized according to the method of claim 3.

EWALD ZAUCKER.